United States Patent [19]

Laferty et al.

[11] 4,189,381
[45] Feb. 19, 1980

[54] WASTE WATER TREATMENT

[75] Inventors: John M. Laferty, Wheatridge; Gary G. Van Riper, Morrison; Weldon P. Zundel, Lakewood, all of Colo.

[73] Assignee: Amax Inc., Greenwich, Conn.

[21] Appl. No.: 940,065

[22] Filed: Sep. 7, 1978

[51] Int. Cl.² ............................................. C02C 5/08
[52] U.S. Cl. .................................. 210/28; 210/37 B; 210/38 B; 210/44
[58] Field of Search ...................... 210/28, 37 B, 38 B, 210/44, 50–54, 63 R, 73 R, 62, DIG. 31

[56] References Cited

U.S. PATENT DOCUMENTS

| | | | |
|---|---|---|---|
| 3,617,539 | 11/1971 | Grutsch et al. | 210/53 |
| 3,766,035 | 10/1973 | Ichiki et al. | 210/44 |
| 3,788,983 | 1/1974 | Fries | 210/28 |
| 3,826,741 | 7/1974 | Nakamura | 210/50 |
| 3,972,810 | 8/1976 | Chopra | 210/38 B |

Primary Examiner—Charles N. Hart
Assistant Examiner—Ivars Cintins
Attorney, Agent, or Firm—Michael A. Ciomek; Eugene J. Kalil

[57] ABSTRACT

Waste water containing over 2 ppm Mo and at least one heavy metal impurity selected from the group consisting of Fe, Mn, Cu, Zn, Pb, and Cd, and also containing cyanide ion (CN) is treated by passing waste water having an adjusted pH value ranging from about 3 to 4 through an ion-exchange resin column selective to the removal of Mo and provide an ion-exchange effluent containing at least one of said heavy metal impurities and said cyanide ion. The pH value of the effluent is then adjusted to a range of about 7 to 11 sufficient to precipitate the heavy metal impurity having the highest pH requirement for precipitation, following which the precipitate is flocculated and the effluent containing the flocculated precipitate then subjected to electrolysis using insoluble electrodes to form electrolytic oxygen and hydrogen and effect electroflotation of the flocculated precipitate and form a froth thereof which is separated from the effluent by skimming.

6 Claims, 1 Drawing Figure

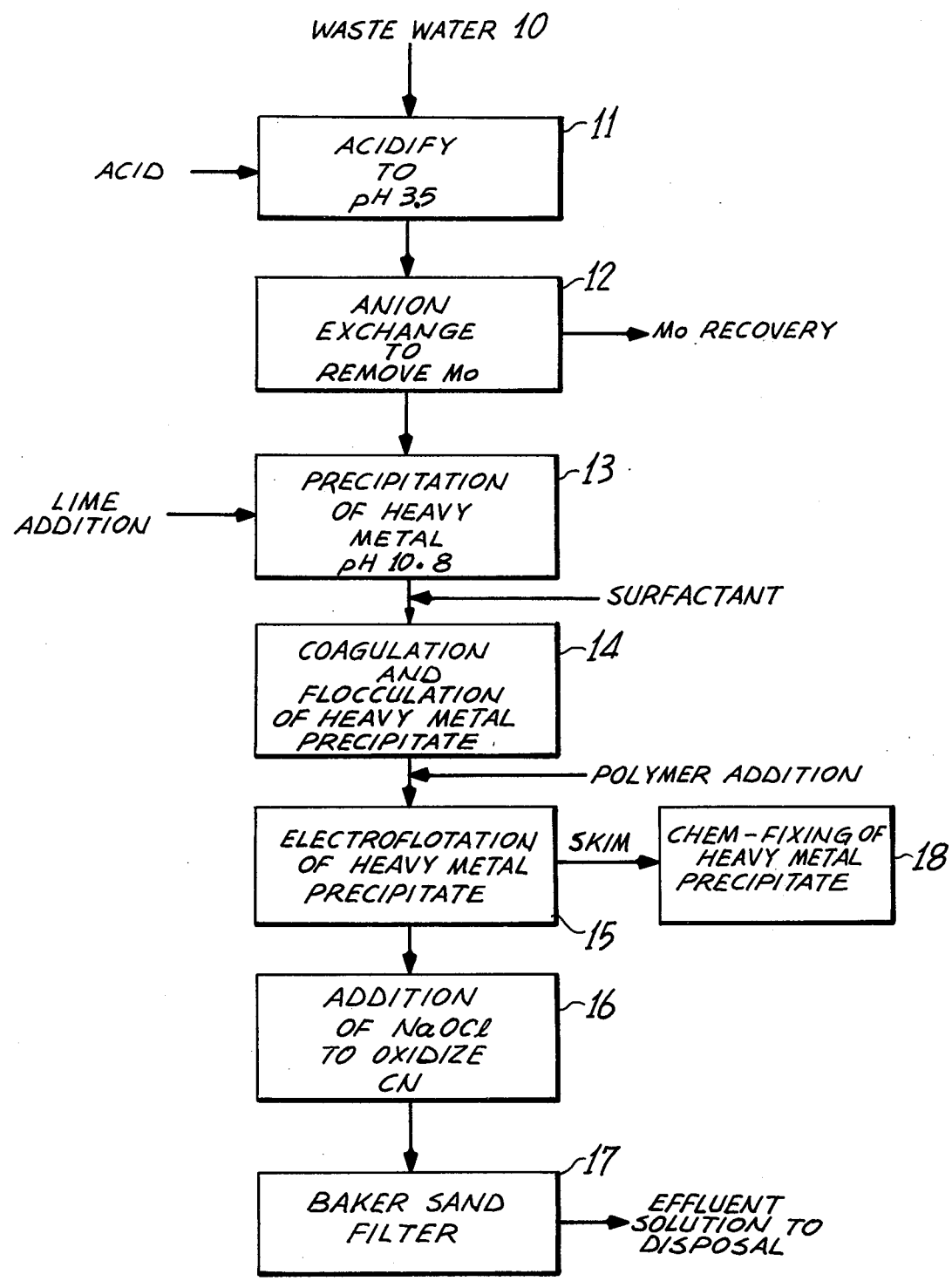

WASTE WATER TREATMENT

This invention relates to the treatment of industrial waste water for recycling to surface waters and, in particular, to the treatment of waste water obtained in mineral recovery processes, such as in the flotation recovery of molybdenite.

BACKGROUND OF THE INVENTION

Large amounts of water are employed in flotation processes which generally require a water recycle system utilizing active tailing dams and water storage facilities to collect mill water and then subsequently return the water for reuse into the flotation system.

While the system employed enabled total containment of the waste water during certain parts of the season, this was not always possible during the annual spring runoff of melted snow. Thus, the annual rapidly increasing runoff into the tailing system made it necessary to discharge some of the industrial water from the system into surface waters in order to keep the total system in balance.

The water effluent or waste water obtained in molybdenite flotation generally contains small concentrations of heavy metals, such as molybdenum, copper, zinc, iron, and the like, as a result of solubilization during the flotation process. The mill water may also contain combined cyanide in concentrations of less than about two or one part per million introduced in the mill circuit as sodium cyanide which is used as a copper depressant. Such waters present a pollution problem if discharged into the surrounding environment.

It would thus be desirable to provide a waste water treatment process to remove substantially said heavy metals in accordance with the prevailing target amounts for such waters.

OBJECTS OF THE INVENTION

It is an object of the invention to provide a process for treating waste water containing heavy metals and produce an effluent with the heavy metal ions and cyanide ion substantially reduced.

Another object is to provide a process for removing heavy metal ions from industrial waste waters, for example, industrial waste waters of the type obtained in the flotation recovery of molybdenite.

These and other objects will more clearly appear from the following disclosure and the accompanying drawing which is a flow sheet showing one embodiment for carrying out the process of the invention.

STATEMENT OF THE INVENTION

One embodiment of the invention is directed to an environmental pollution control process for treating waste water containing over 2 ppm Mo and at least one heavy metal impurity selected from the group consisting of over 2 ppm Fe, over 1 ppm Mn, over 0.05 ppm Cu, over 0.2 ppm Zn, over 0.01 ppm Pb, and over 0.015 ppm Cd, as well as over 0.025 ppm CN ion, particularly waste water obtained in the flotation recovery of molybdenite. The process comprises passing waste water having an adjusted pH value ranging from about 3 to 4 through an ion-exchange resin column selective to the removal of Mo to a level not exceeding 2 ppm and provide an ion-exchange effluent containing said at least one heavy metal impurity, adjusting the pH value of said effluent to a range of about 7 to 11, the pH value selected being sufficient to precipitate that heavy metal impurity having the highest pH requirement for precipitation, coagulating and flocculating said precipitate, and then subjecting the flocculated precipitate-containing effluent to electrolysis using insoluble electrodes to form electrolytic oxygen and hydrogen and effect electroflotation of the flocculated precipitate by virtue of the presence of bubbles of electrolytic oxygen and hydrogen and form a froth thereof, the froth containing the heavy metals being thereafter separated from the effluent. The effluent is then filtered to provide a clean tailing liquor containing not more than 2 ppm Mo and not more than 2 ppm Fe, 1 ppm Mn, 0.05 ppm Cu, 0.2 ppm Zn, 0.01 ppm Pb, 0.015 ppm Cd, and 0.025 ppm CN.

The waste water obtained from the molybdenite flotation process may typically contain the following in parts per million or mg/1.

| FEED ANALYSIS | | | | | | | |
|---|---|---|---|---|---|---|---|
| Fe | Mn | Cu | Zn | Pb | Mo | Cd | CN |
| 3–7 | 5–7 | 0.025–0.16 | 0.2–0.4 | >0.01 | 2–24 | 0.015 | 0.2–0.5 |

The effluent after treatment is deemed to be substantially cleaned of impurities when it contains a maximum of the following:

TABLE 1

| EFFLUENT ANALYSIS | | | | | | | |
|---|---|---|---|---|---|---|---|
| Fe | Mn | Cu | Zn | Pb | Mo | Cd | CN |
| 2 | 1 | 0.05 | 0.2 | <0.01 | 2 | 0.015 | ≦0.025 |

DETAILS OF THE INVENTION

In carrying the invention into practice, the waste water containing molybdenum and at least one other heavy metal ion is adjusted to a pH of about 3 to 4 and the waste water then passed through an ion-exchange column containing an ion-exchange resin selective to the removal of molybdenum from solution. A preferred ion-exchange resin is a weak-base amine type anion exchange resin. This type of resin has a high capacity for molybdenum absorption and, moreover, has a high affinity for hydroxyl ions which allow for effective elution of molybdenum from the resin with smaller alkaline requirements.

One example of an ion-exchange resin is one sold under the trademark IRA 99, formerly Amberlite XE-299. This resin is a macro-reticular weakly basic anion exchange resin with a tertiary amine functional group attached to a copolymer of styrene-divinyl benzene as a polymer matrix. With this type of resin, laboratory loadings of up to about 12 pounds of molybdenum have been obtained at a cumulative percent recovery of over 90%. The resin in the hydroxyl form does not have a high capacity of adsorbing molybdenum but does have a high capacity in the bisulfate or chloride form. Sulphuric acid is preferred as the regenerant in that it is cheaper and also that it avoids contamination of the effluent water with chloride ions.

Tests have shown that an average molybdenum concentration of 2 parts per million could be obtained in waste water from a feed concentration ranging from about 2 to 24 parts per million, the average resin loading being about 3.66 lbs/ft$^3$ of resin at these molybdenum feed concentrations. The average resin loadings at these feed concentrations would be higher when using a pulsed column.

Molybdenum resin elution efficiencies in excess of 98% were obtained using sodium hydroxide as the eluant, the resulting sodium molybdate solution containing about 16 to 19 grams of molybdenum per liter.

A series of tests were conducted in which the feed waste water had a pH value of about 3.5 and contained an average of about 22.2 ppm Mo. Over a period of 8 days, the feed solution was processed by passing it through the resin bed at a 24-hour operating schedule basis, the average feed rate for the 8 days being about 41.4 gallons per minute per square foot of resin bed (cross sectional area). The average molybdenum content of the feed was reduced from 22.2 ppm to 1.3 ppm, the average bed loading being about 3.9 lbs. Mo per ft.$^3$ of resin, about 94.1% of the total molybdenum being recovered. It was surprisingly noted that the resin removed from about 50% to 70% of the cyanide ion.

At a downflow rate of about 41 gallons per minute per sq. ft. of resin, the pressure drop through the resin bed was 40 lbs/in.$^2$ which was found to be within the allowable maximum of 40 lbs/sq.in. as recommended by the resin manufacturer to avoid excessive physical resin degradation.

Following substantial removal of the molybdenum from the feed solution, the resulting effluent is then processed to remove the heavy metals present. This is achieved by adjusting the pH value of the effluent to a level within the range of 7 to 11, the level chosen being that sufficient to precipitate that heavy metal impurity having the highest pH requirement for precipitation, for example, manganese. Thus, the heavy metals present having a low pH requirement are assured of being precipitated.

The desired pH value (e.g., 10.8) is obtained by employing lime as the base, although other bases may be employed to neutralize the acid and precipitate the heavy metals as hydroxides. After lime precipitation, the precipitate is flocculated by the addition of a polymer flocculating agent, e.g., polyelectrolytes, such as one sold under the trademark DOW MG-700 and PERCOL 728 sold by Allied Colloid, Inc. The preferred flocculants are polyacrylamides, for example, non-ionic or weakly anionic polyacrylamide of the following formulation:

(CH$_2$=CHCONH$_2$)$_x$ where X denotes the number of mer units making up the polymer, the high molecular weight polymer being preferred.

In a preferred embodiment, before the flocculant is added, the precipitate slurry is conditioned in an electrocoagulation cell for upwards of several minutes, e.g., 1 or 2 or 3 minutes, by contacting said slurry with bubbles of electrolytic hydrogen and oxygen generated in an electrolytic cell using insoluble electrodes. The coagulated slurry is then treated as follows:

The slurry is flocculated and then subjected to electroflotation in an electrolytic cell using insoluble electrodes, the amount of current employed being sufficient to generate substantial amounts of electrolytic oxygen and hydrogen which in the form of micro bubbles effect flotation of the agglomerated heavy metal precipitate. This process is referred to in the trade as the Swift Lectro Clear process.

The froth produced in the cell is skimmed off and the final effluent either recycled into the molybdenite flotation process or disposed of by discharging it into environmental waters following flotation, assuming little or no cyanide present.

In a pilot plant unit designed for an average flow of 10 gallons per minute, the residence times for the various stages of treatment comprised 10 minutes for lime neutralization, one minute for treatment in the electrocoagulation cell via contact with electrolytic hydrogen and oxygen to condition the precipitate for the flocculation step and the addition immediately thereafter of the polymer flocculant followed by electroflotation at at residence time of 25 minutes to effect flotation of the flocculated precipitate.

The process steps employed are illustrated in the accompanying flow sheet which shows waste water 10 going to acid treatment 11 where the pH value is adjusted within the range of 3 to 4, e.g., 3.5, following which the acidified waste water is passed through an anion-exchange column 12 to remove molybdenum and provide an effluent impoverished in molybdenum, that is, not exceeding 2 ppm.

The effluent is then neutralized with lime at 13 to a pH value of about 10.8 to precipitate heavy metal hydroxides which are thereafter treated at 14 in an electrocoagulation cell, a polymer flocculant thereafter added, including a surfactant, and the flocculated precipitate subjected to electroflotation. A preferred surfactant is one designated by the trademark 85L sold by Stauffer Chemical Co.

This is achieved by charging the flocculated slurry into an electrolytic cell 15 operated with insoluble electrodes where the slurry is subjected to electroflotation using generated micro bubbles of oxygen and hydrogen as the means of forming a froth which is skimmed off as shown.

In the event any residual cyanide ions are present in excess of the safe limit (i.e., in excess of 0.06 ppm), a treatment step 16 is added in which sodium hypochlorite (NaOCl) or other oxidizing agent is added in amounts ranging up to about 50 ppm to oxidize the cyanide ion. Following this treatment, the effluent is passed through a Baker Sand filter 17 before being sent to disposal.

Most of the processes employed for the detoxification of waste water of cyanides utilize the oxidation approach to remove free cyanide and transition metal coordination cyanide complexes.

One method utilizes chlorine gas injected into the waste water stream, the waste water being first rendered alkaline by adjusting its pH value to a range of about 10.5 to 11. Laboratory tests conducted at 10° C. at pH values of 9.5 and 10.5, respectively, on waste water containing 0.18 ppm of CN ion gave the following results:

TABLE 2

| pH | CN CONCENTRATION | | | |
|---|---|---|---|---|
| | 9.5 | | 10.5 | |
| Residence Time | 15 min | 30 min | 15 min | 30 min |
| 20 ppm Cl$_2$ | 0.07 | 0.05 | 0.06 | — |
| 30 ppm Cl$_2$ | 0.13 | 0.05 | 0.05 | — |
| 50 ppm Cl$_2$ | 0.04 | — | 0.02 | — |
| Feed | 0.18 | 0.18 | 0.18 | 0.18 |

As will be noted, more efficient results are obtained with the higher pH level, the addition of 50 ppm chlorine gas at 10.5 pH reducing the cyanide concentration to a level of about 0.02 ppm in 15 minutes. It was difficult to achieve the same result on a large scale, although the cyanide concentration could be substantially reduced.

Laboratory tests on the use of hypochlorite salts indicated such salts to be also useful in lowering the cyanide content. The use of NaOCl was extensively studied and found to perform well. A feed solution containing 0.19 part per million cyanide (CN) was treated with 10 ppm and 20 ppm NaOCl concentration at various pH levels above 7 and the following results obtained:

TABLE 3

| pH | 8.8 | | 10.6 | | 11.0 | |
| --- | --- | --- | --- | --- | --- | --- |
| NaOCl Concentration | 10 ppm | 20 ppm | 10 ppm | 20 ppm | 10 ppm | 20 ppm |
| 30 minutes | — | 0.08 | 0.04 | 0.03 | 0.03 | 0.01 |
| 60 minutes | — | 0.05 | 0.03 | 0.02 | 0.03 | 0.02 |
| 90 minutes | — | 0.07 | 0.04 | 0.02 | 0.03 | 0.02 |

Tests were also conducted on a large scale (pilot plant) and the effect of pH, residence time, and NaOCl concentration studied. NaOCl concentrations of 5 ppm, 10 ppm, 20 ppm, and 40 ppm were studied. The average cyanide concentration in the effluent during a 66-hour run was about 0.052 mg/liter or 0.052 ppm. Increasing the amount of hypochlorite addition did not materially affect the cyanide degradation. Concentrations as high as 40 ppm of NaOCl resulted in no significant decrease in effluent cyanide levels as compared to 5 ppm NaOCl solution at residence times of 33 minutes, 48 minutes, and 78 minutes. The best results were obtained at pH values over 10.

For a period of about 11 days, a feed water having a pH value of about 10.6 and an average CN ion concentration of about 0.2 ppm was treated with 20.9 ppm NaOCl at a residence time of about 33 minutes to provide an effluent averaging up to about 0.06 ppm cyanide. It was observed that the combined effects in the process of cyanide removal in the ion exchange step and the subsequent treatment with hypochlorite followed by filtering produced an effluent with the desired cyanide limits.

It was also observed that to assure substantially complete removal of the precipitated heavy metal hydroxides following skimming of the electroflotation product, a sand filter should be employed in order to polish or insure quality of the effluent.

A total circuit analysis of a pilot run is given in Table 4.

TABLE 4

| Analysis Sample | Heavy Metals Milligrams Per Liter or ppm | | | | | | pH | CN mg/l (ppm) |
| --- | --- | --- | --- | --- | --- | --- | --- | --- |
| | Fe | Mn | Zn | Cu | Cd | Mo | | |
| Feed | 4.3 | 6.4 | 0.29 | 0.19 | 0.01 | 5.9 | 6.5 | 0.28 |
| Ion-Exchange Effluent | — | 6.2 | 0.28 | 0.17 | 0.01 | 1.1 | 3.5 | 0.08 |
| Effluent[1] | 0.65 | 1.0 | 0.05 | 0.05 | 0.01 | 0.6 | 10.5 | 0.035 |
| Filtered Effluent[2] | 0.10 | 0.10 | 0.022 | 0.013 | 0.01 | 0.6 | 10.5 | 0.01 |

[1]After electroflotation and removal of precipitate.
[2]After filtration of effluent 1.

As will be noted, the feed was substantially reduced in impurities in accordance with the target goals set. Thus, following the ion-exchange step at a pH value of 3.5, the molybdenum content was reduced from 5.9 ppm to 1.1 ppm. Following precipitation of the heavy metals and the removal thereof by electroflotation, the effluent was substantially reduced in Fe, Mn, Zn, Cu, and Cd, in addition to Mo. Following hypochlorite treatment with a small but effective amount of the hypochlorite at a pH value of 10.5 and filtering through sand at the rate of 5 gallons per minute per square foot of filter, the heavy metals in the filtered effluent and the cyanide were further reduced, the cyanide ion being reduced to 0.01 ppm. Before disposing of or recycling the cleaned effluent, the pH value is adjusted to about 6 to 8.5.

The heavy metal precipitate separated at 18 in the flow sheet is preferably subjected to a "chem-fix" step before disposing of it into the environment. One method of chem-fixing is to mix the heavy metal precipitate with portland cement using sodium silicate as a binder to enable storage of the material in the environment without polluting the environment.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An environmental pollution control process for treating waste water containing over 2 ppm Mo and at least one heavy metal impurity selected from the group consisting of over 2 ppm Fe, over 1 ppm Mn, over 0.05 ppm Cu, over 0.2 ppm Zn, and over 0.015 ppm Cd, and containing over 0.025 ppm CN ion which comprises:

passing said waste water having an adjusted pH value ranging from about 3 to 4 through an ion-exchange resin column selective to the removal of Mo to a level not exceeding about 2 ppm to provide an ion-exchange effluent containing said at least one heavy metal impurity and said CN ion, adjusting the pH value of said effluent to a range of about 7 to 11, the pH value selected being sufficient to precipitate that heavy metal impurity having the highest pH requirement for precipitation, subjecting said precipitate to electrocoagulation and flocculation and provide a flocculated dispersion of said precipitate, subjecting said flocculated precipitate-containing effluent to electrolysis using insoluble electrodes to form micro bubbles of electrolytic oxygen and hydrogen and effect electroflotation of said flocculated precipitate and form a froth thereof, skimming off said froth to provide a substantially clean effluent containing residual amounts of cyanide in excess of 0.025 ppm, adding a small but effective amount of an oxidizing agent selective to the oxidation of said contained cyanide sufficient to reduce it to a value not exceeding about 0.025 ppm, and then filtering said effluent, whereby a cleaned liquor is obtained containing not more than 2 ppm Mo and not more than 2 ppm Fe, 1 ppm Mn, 0.05 ppm Cu, 0.2 ppm Zn, 0.015 ppm Cd, and 0.025 ppm CN ions.

2. The process of claim 1, wherein the oxidation of the CN ion is carried out at a pH value of at least about 10.

3. The process of claim 1, wherein the filtering of the effluent is effected through a sand filter.

4. The process of claim 1, wherein the filtered effluent is adjusted to a pH value of about 6 to 8.5 before it is disposed of.

5. The process of claim 1, wherein the oxidizing agent is selected from the group consisting of alkali metal and alkaline earth metal hypochlorites.

6. The process of claim 1, wherein the amount of the oxidizing agent added ranges up to about 50 ppm.

* * * * *